United States Patent Office 3,149,912
Patented Sept. 22, 1964

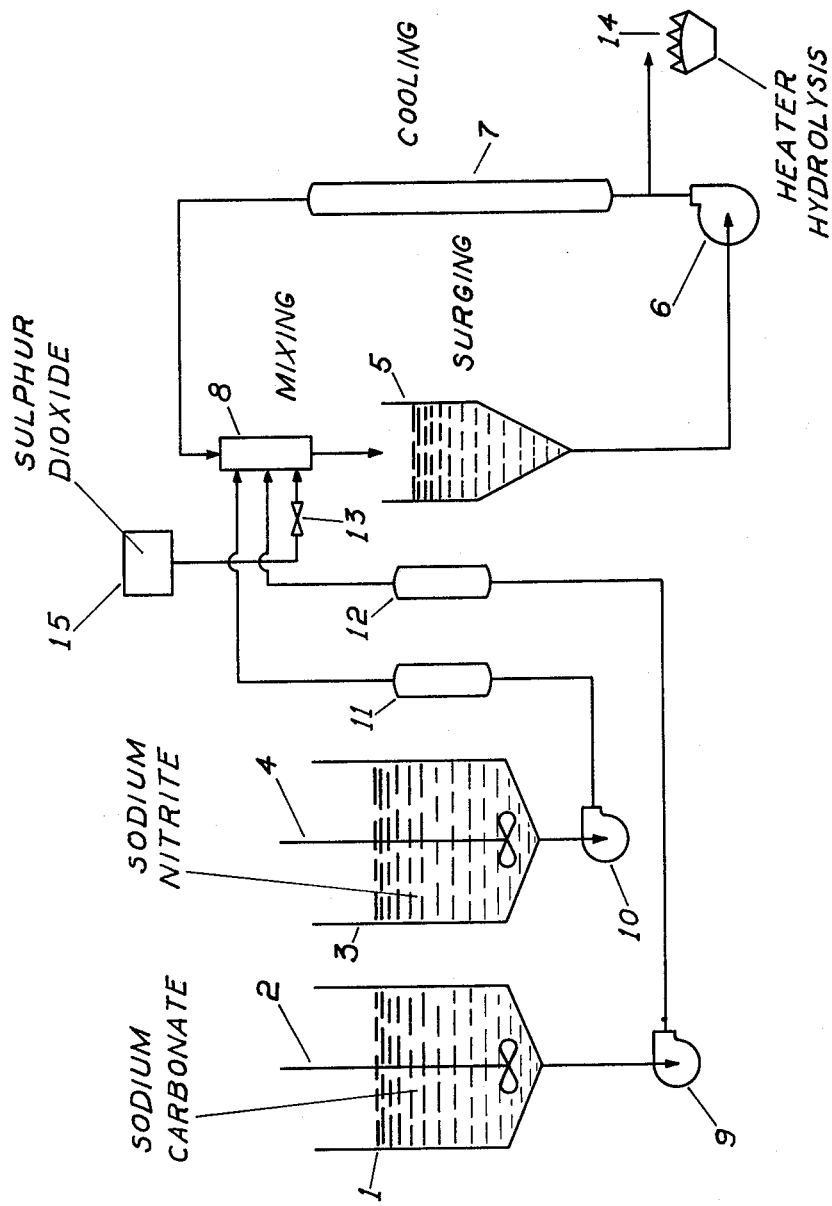

3,149,912
CONTINUOUS METHOD FOR SYNTHESIS OF HYDROXYLAMINE SULFATE
Mearl A. Kise and Charles E. Winslow, Jr., both of Portsmouth, Va., assignors to Virginia Chemicals & Smelting Company, West Norfolk, Va., a corporation of Maine
Filed Oct. 24, 1961, Ser. No. 147,219
8 Claims. (Cl. 23—117)

The present method is directed to a continuous method for synthesis of hydroxylamine sulfate, particularly a method wherein concentrated reactant solutions may be employed without refrigeration and the resultant reacted material is recycled for only limited contact with the reactant solutions.

Methods have been previously known for the preparation of hydroxylamine disulfonate solutions. In particular, the Raschig synthesis and modifications of it have been described in German Pat. Nos. 41,987; 216,747, U.S. Pat. No. 1,010,177 and Report 96006, PB 25622 (Research Information Service, 40 E. 23rd St., N.Y.C. 10). According to the Raschig method, sodium nitrite and sodium acid sulfite in aqueous solution are reacted together in batch operation at a temperature of approximately 0° C. Then, sulfur dioxide gas is passed into the resulting solution until a sharp decrease in the solution pH indicates the completion of the reaction. The Raschig process is conducted at a temperature of approximately 0° C. The maintenance of a temperature of 0° C. or less is necessary for the production of hydroxylamine sulfate in satisfactory yield. In the Raschig batch synthesis, the solution containing the reactants forms a dominant bath in which the reaction takes place. The concentrations of the reactants in solution has a marked effect on the yield with low concentrations favoring high yields. Because Raschig's is a batch reaction, localized hot areas and regions of high acidity must occur at the point of reactant addition, no matter how vigorous the agitation. These conditions promote the various side reactions which can occur in Raschig's system to the detriment of the yield. Dilute reactants minimize these local adverse conditions, but necessitate the processing of excessive amounts of water to obtain the dry salt with attendant handling and thermal decomposition losses. Intensive cooling to a low temperature promotes rapid dissipation of the heat of reaction away from the reaction site at the point of addition of the reactants but the refrigeration equipment investment is large. One of the adverse reactions possible is the hydrolysis of the first formed hydroxylamine disulfonate to hydroxylamine monosulfonate. The disulfonate is inert toward the reactants, while the monosulfonate can react with both nitrite and sulfur dioxide. Thus, any monosulfonate which forms decreases the reaction yield by consuming reactants and by being itself destroyed.

Various means of overcoming the Raschig deficiencies, i.e., "batch" processing and the necessity for using dilute solutions with intensive cooling for satisfactory yields have been proposed. Kahr U.S. Patent 2,785,954 describes a system whereby continuous synthesis is effected. By the Kahr method, a premixed solution of ammonium nitrite and ammonium carbonate is added to a recirculating stream of previously reacted solution at pH 2 to 4. Sulfur dioxide gas is then added to the mixed stream using a packed tower. The recirculating stream must be maintained at a temperature between 0° and −3° C. by cooling. A portion of this stream is withdrawn continuously to be hydrolyzed past the monosulfonate stage to form hydroxylamine sulfate. The recirculating stream is pumped at such a rate as to allow control of the pH and temperature. Yields of 90% are obtained with this method even when producing 12% hydroxylamine sulfate solution, but cooling to 0° C. is still required. Schmidt and Rohl German Pat. 900,337 describe a similar system, except that calcium nitrite and calcium carbonate are used as the reactants producing a 4% hydroxylamine sulfate solution. Nagle U.S. Pat. No. 2,458,404 describes another method of continuous synthesis. By this method, a premixed solution of sodium nitrite and sodium bisulfite (or other inorganic nitrite and bisulfite) is caused to flow as a film down the wall of a vertical tower. Contact between this film and sulfur dioxide gas contained in the tower causes absorption of the sulfur dioxide. The contact must be brief (less than 10 seconds) and the reacted material withdrawn from the tower bottom is never allowed to contact the reactants. Satisfactory operation and yields of 90% are claimed at tower operating temperatures of 10° to 75° C. However, dilute solutions of the reactants are needed to achieve these results, resulting in a final solution of 3% hydroxylamine sulfate. Rohl German Pat. No. 936,264 describes the use of sulfides to catalyze the standard Raschig synthesis.

According to the present method hydroxylamine sulfate is continuously synthesized by preparing concentrated reactant solutions of sodium carbonate and sodium nitrite, separately circulating previously reacted liquid through an endless surging, cooling and mixing circuit, mixing the reactant solutions with sulfur dioxide in the mixing area, surging said reactant solutions and sulfur dioxide within said surging area, sequentially withdrawing a portion of the circulating liquid, recirculating non-withdrawn liquid through said cooling, mixing and surging circuit and mixing said recirculating liquid with said reactant solutions and sulfur dioxide in said miixng area. The synthesis is thus carried out in a continuous manner to produce a concentrated solution of hydroxylamine sulfate without refrigeration equipment and without the necessity for employing dilute reactant solutions.

Accordingly, it is an object of invention to provide a continuous method for synthesis of hydroxylamine sulfate.

Another object of invention is to provide a method for synthesis of hydroxylamine sulfate without refrigeration equipment.

Another object of invention is to provide a method for synthesis of hydroxylamine sulfate wherein concentrated reactant solutions may be employed.

Another object of invention is to provide a continuous method of hydroxylamine synthesis wherein the formation of hydroxylamine monosulfate is severely limited.

Yet additional objects of invention will become apparent from the ensuing specification and attached drawing which schematically illustrates a synthesis system maintained according to the present method.

According to the present method, improved synthesis of hydroxylamine sulfate is continuously accomplished to produce a concentrated solution of hydroxylamine sulfate without the use of a low temperature and the necessary refrigeration equipment. High concentrations of aqueous solutions of sodium nitrite and sodium carbonate, together with sulfur dioxide, are introduced individually and reacted in a relatively small volume made very dilute with respect to the reactants by the rapid distribution of the reactants through a recycle of previously reacted solution and by the very rapid reaction of the added ingredients. The reaction, essentially instantaneous, takes place without excessive detrimental side reactions at any temperature between 30° F. and 130° F. and does not require low temperature cooling. This is feasible only because of the tremendous dilution of the strong reactants effected by the rapid recirculation (at least 50 times the reactant feed rate) of essentially inert, previously made hydroxylamine disulfonate solution. Local areas of high temperature or acidity are minimized by this dilution, thus greatly suppressing the hydrolysis of the disulfonate to monosulfonate, as well as other side and consecutive reactions. This rapid recycling also permits the use of a relatively small volume of reaction liquid as a dominant bath, yet having the effect of a large volume of liquid. The small volume of reaction liquor is used to limit disulfonate to monosulfonate conversion as discussed below.

The present method provides excellent control of the liquor pH, which must be maintained between 2 and 4. Cooling may be obtained by any conventional means instead of by refrigeration. Even in the absence of localized adverse conditions, as discussed earlier, some hydrolysis of the disulfonate to the monosulfonate must occur. To severely limit this undesired reaction and maintain the suitability of reacted liquor as a reactant diluent, it is also necessary to limit the retention of reacted liquor in the apparatus. The physical dimensions of the equipment should be such as to allow a maximum average retention time of reacted material of 30 minutes or, more desirably, 20 minutes for any throughput rate. Reacted material may be continuously withdrawn to maintain the proper inventory and subsequently heated to affect the complete hydrolysis of disulfonate to hydroxylamine sulfate.

An example of synthesis according to the present method is illustrated in the drawing wherein a 20% by weight reactant solution of sodium carbonate in water is prepared in tank 1 agitated by mixer 2. In tank 3 agitated by mixer 4, a 33.3% by weight reactant solution of sodium nitrite in water is prepared. Four liters of water are placed in tank 5. Pump 6 is started to circulate this water through cooler 7 and mixer 8, back to tank 5 at a rate of 40 liters per minute. Pumps 9 and 10 are then started so that sodium nitrite solution and sodium carbonate solution enter mixer 8 through flow meters 11 and 12 at respective rates of 7,584 grams per hour and 9,720 grams per hour. Simultaneously with the starting of pumps 9 and 10, sulfur dioxide is admitted to the mixer from tank 15 through valve 13 at such a rate as to maintain the solution at pH 3.5. Withdrawal of liquid is started immediately to maintain a constant level in tank 5. The withdrawn liquid is heated by heater 14 to effect hydrolysis to hydroxylamine sulfate at an elevated temperature. After steady operation is attained, 20,400 grams per hour of reacted liquid assaying 13.25% hydroxylamine sulfate is obtained. This corresponds to a yield of 90% based on the sodium nitrite used. During operation, cooling water is admitted to cooler 7 at such a rate as to maintain the reacting liquid at approximately 100° F.

Inorganic nitrites other than sodium nitrite may be used, for example, potassium nitrite, ammonium nitrite, calcium nitrite, etc. Also salts such as sodium hydroxide, sodium sulfite, sodium bicarbonate or sodium bisulfite may be substituted for the sodium carbonate. These salts too may be other than sodium, as ammonium salts, potassium salts, calcium salts, etc. Also, the sodium carbonate and sodium nitrite solutions may be premixed prior to mixing with the sulphur dioxide. Gaseous or liquid sulfur dioxide may be used or sulfur dioxide containing gases may be substituted, if economically desirable. The process may be carried out at atmospheric or superatmospheric pressure as desired. The proportions of the ingredients used, whatever they may be, should be kept within closely controlled limits.

In summary, the advantages which distinguish the present method of synthesis of hydroxylamine sulfate from prior art are:

(1) Using of concentrated reactant solutions which, in turn, are greatly diluted by a rapid recirculation of inert, previously reacted material. Because of the rapidity of the desired reaction, the reactants are almost instantly consumed and become inert toward additional reactants. This allows the synthesis of a concentrated product stream with all the benefits of using dilute reactants and/ or refrigeration in cooling the reaction mixture.

(2) Limiting the retention time of reacted material in the apparatus to 30 minutes or less by having a relatively small system holdup of reaction liquor compared to throughout capacity. This severely limits the formation of hydroxylamine monosulfonate from the disulfonate in the system and thus eliminates side reactions of the monosulfonate with the fresh reactants.

Because of these advantages, the need for low temperature operation is no longer present. Also, because of gross dilution at the instant of addition of reactant solutions, the concentrations of the reactants, and thus that of the final product stream, are limited only by the solubility of the various chemicals involved. A yield of 90% or greater can be obtained when synthesizing a product stream containing as high as 14% hydroxylamine sulfate and operating at 100° F.

As will be apparent, various modifications in the mixing, surging and cooling equipment may be employed and the specific proportions of mixed reactants, the specific pH and temperatures maintained and like controls may be modified without departing from the spirit and scope of invention, as defined in the subjoined claims.

We claim:

1. Continuous method for synthesis of hydroxylamine sulfate comprising:
   (a) preparing concentrated reactant solutions of sodium carbonate and sodium nitrite,
   (b) separately circulating previously reacted liquid through surging, cooling and mixing areas,
   (c) mixing said reactant solutions with sulfur dioxide in said mixing area, at a temperature in the range 30 to 130° F.,
   (d) surging said reactant solutions and sulfur dioxide within said surging area,
   (e) sequentially withdrawing circulating liquid, at a rate such that said liquid is not circulated more than 30 minutes,
   (f) rapidly circulating non-withdrawn liquid through said cooling, mixing and surging areas the ratio of recirculating liquid to reactant solution being at least 50 to 1, and
   (g) mixing a small volume of said recirculating liquid with said reactant solutions and sulfur dioxide in said mixing area.

2. Method as in claim 1, wherein withdrawn liquid is heated to enhance hydrolysis to hydroxylamine sulfate.

3. Continuous method for synthesis of hydroxylamine sulfate comprising:
   (a) preparing respectively approximately 20% sodium carbonate and approximately 33.3% sodium nitrite reactant solutions,
   (b) separately circulating previously reacted liquid through surging, cooling and mixing areas,
   (c) mixing said reactant solutions with sulfur dioxide in said mixing area, at a temperature in the range 30 to 130° F.,
   (d) surging said reactant solutions and sulfur dioxide within said surging area,
   (e) sequentially withdrawing circulating liquid, at a rate such that said liquid is not circulated more than 30 minutes,
   (f) rapidly recirculating non-withdrawn liquid through said cooling, mixing and surging areas the ratio of recirculating liquid to reactant solution being at least 50 to 1, and
   (g) mixing a small volume of said recirculating liquid with said reactant solutions and sulfur dioxide in said mixing area.

4. Method as in claim 3, wherein said sulfur dioxide is mixed at a rate so as to maintain said reacted solution in the range pH 2 to 4.

5. Method as in claim 3, wherein one mole of sodium carbonate as a solution is mixed with two moles of sodium nitrite as a solution in said mixing area.

6. Method as in claim 3, including cooling of said recirculating liquid to maintain a temperature of 100° F.

7. Continuous method for synthesis of hydroxylamine sulfate comprising:
(a) preparing respectively approximately 20% sodium salt and approximately 33.3% inorganic nitrite reactant solutions,
(b) separately circulating previously reacted liquid through surging, cooling and mixing areas,
(c) mixing said reactant solutions with sulfur dioxide in said mixing area at a temperature in the range 30 to 130° F.,
(d) surging said reactant solutions and sulfur dioxide within said surging area,
(e) sequentially withdrawing circulating liquid, at a rate such that said liquid is not circulated more than 30 minutes,
(f) rapidly recirculating non-withdrawn liquid through said cooling, mixing and surging areas the ratio of recirculating liquid to reactant solution being at least 50 to 1, and
(g) mixing a small volume of said recirculating liquid with said reactant solutions and sulfur dioxide in said mixing area.

8. Method as in claim 7 including premixing said sodium salt and said inorganic nitrite.

References Cited in the file of this patent
UNITED STATES PATENTS
2,785,954      Kahr ------------------ Mar. 19, 1957